(12) United States Patent
Liao et al.

(10) Patent No.: US 12,162,634 B2
(45) Date of Patent: Dec. 10, 2024

(54) UAV DOCKING STATION AND UAV ASSEMBLY

(71) Applicant: AUTEL ROBOTICS CO., LTD., Shenzhen (CN)

(72) Inventors: Jianlong Liao, Shenzhen (CN); Yuelong Liao, Shenzhen (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 0 days.

(21) Appl. No.: 18/219,080

(22) Filed: Jul. 6, 2023

(65) Prior Publication Data

US 2024/0010368 A1  Jan. 11, 2024

(30) Foreign Application Priority Data

Jul. 6, 2022  (CN) .......................... 202221744664.5

(51) Int. Cl.
  B64U 70/90  (2023.01)
  B64F 1/222  (2024.01)

(52) U.S. Cl.
  CPC .............. B64U 70/90 (2023.01); B64F 1/222 (2013.01)

(58) Field of Classification Search
  CPC .......... B64U 70/90; B64U 70/92; B64F 1/222
  See application file for complete search history.

(56) References Cited

U.S. PATENT DOCUMENTS

| 2016/0364989 | A1 | 12/2016 | Speasl et al. |
| 2018/0295327 | A1 | 10/2018 | Yearwood |
| 2018/0354649 | A1* | 12/2018 | Ortiz ................... G08B 13/1436 |
| 2021/0107682 | A1* | 4/2021 | Kozlenko .............. B64D 45/08 |

FOREIGN PATENT DOCUMENTS

| CN | 209938989 U | 1/2020 |
| CN | 214241270 U | 9/2021 |
| CN | 108438245 B | 10/2021 |
| CN | 113479337 A * | 10/2021 |

OTHER PUBLICATIONS

Extended European Search Report of EP Application No. 23183913.5 dated Nov. 29, 2023, (10p).

* cited by examiner

*Primary Examiner* — Richard G Davis
(74) *Attorney, Agent, or Firm* — Arch & Lake LLP

(57) ABSTRACT

An unmanned aerial vehicle (UAV) assembly includes an UAV and an UAV docking station. The UAV docking station includes a housing, an extension piece, and a door. The housing is provided with an accommodation cavity and a hatch communicating with the accommodation cavity. The extension piece comprises an extension cavity and is connected to the housing. The extension piece is disposed on a side portion of a housing end which is near the hatch, and the extension cavity communicates with the accommodation cavity. The door is connected to the housing and disposed at the hatch, and the door is configured to open or close the hatch. A cross-sectional area where the extension cavity communicates with the accommodation cavity is greater than a cross-sectional area of the accommodation cavity. The UAV can be accommodated in the accommodation cavity of the UAV docking station.

18 Claims, 5 Drawing Sheets

UAV DOCKING STATION AND UAV ASSEMBLY

CROSS REFERENCE TO RELATED APPLICATION

This application claims priority of Chinese Patent Application No. 202221744664.5, filed on Jul. 6, 2022, and entitled as "Unmanned Aerial Vehicle (UAV) Docking Station and UAV Assembly," the entire disclosure of which is incorporated herein by reference for all purposes.

BACKGROUND

Unmanned aerial vehicle (UAV) has the advantages of small volume, easy control, and so on. From cable inspection, and ecological environment monitoring to emergency site command, the unmanned aerial vehicle has been widely used in more and more fields and can undertake more and more tasks.

At present, the price of UAVs is still relatively high, belonging to the more expensive items. In order to better preserve the UAV and increase its endurance, the UAV is usually equipped with a special UAV docking station, and the UAV is taken out from the UAV docking station when it is used, or the UAV needs to return to the UAV docking station for power exchange because of insufficient power in the process of operation. However, the UAV docking station for accommodating the fixed-wing UAV is relatively large, and the relatively large volume makes the weight of the UAV docking station relatively large, which is not conducive to movement.

SUMMARY

The embodiments of the present disclosure relate to the technical field of unmanned aerial vehicles (UAVs), and particularly relate to an unmanned aerial vehicle (UAV) docking station and an UAV assembly, which can reduce the volume and weight of the UAV docking station.

According to a first aspect of the present disclosure, an UAV docking station is provided. The UAV docking station includes: a housing, including an accommodation cavity and a hatch communicating with the accommodation cavity; an extension piece including an extension cavity, and being connected to the housing and disposed on a side portion of a housing end which is near the hatch, the extension cavity communicating with the accommodation cavity; and a door disposed at the hatch and configured to opening or closing the hatch; wherein a cross-sectional area where the extension cavity communicates with the accommodation cavity is greater than a cross-sectional area of the accommodation cavity.

According to a second aspect of the present disclosure, an UAV assembly is provided. The UAV assembly includes the UAV docking station according to any of the above-mentioned embodiments; and an UAV, the UAV being able to be accommodated in the accommodation cavity of the UAV docking station; a fuselage of the UAV being accommodated in the accommodation cavity, and a fixed wing of the UAV being accommodated in the extension cavity.

In the embodiments of the present disclosure, by providing an extension piece on the housing, and allowing the extension cavity of the extension piece to communicate with the accommodation cavity of the housing, the cross-sectional area where the extension cavity communicates with the accommodation cavity is greater than the cross-sectional area of the accommodation cavity, so that the UAV docking station can accommodate an UAV in a smaller volume.

DETAILED DESCRIPTION

In order to facilitate an understanding of the present disclosure, a more detailed description of the disclosure is provided below in connection with the accompanying drawings and specific embodiments. It will be understood that when an element is referred to as being "fixed" to another element, it can be directly on the other element or intervening elements may be present. When an element is referred to as being "connected" to another element, it can be directly connected to the other element or intervening elements may be present. The terms "vertical", "horizontal", "left", "right", and the like are used herein for descriptive purposes only.

Unless otherwise defined, all technical and scientific terms used herein have the same meaning as commonly understood by one of ordinary skill in the art to which the present disclosure belongs. The terminology used in the description of the present disclosure herein is for the purpose of describing particular embodiments only and is not intended to be limiting of the disclosure. As used herein, the term "and/or" includes any and all combinations of one or more of the associated listed items.

With the rise of intelligent unmanned equipment, in the technical field of unmanned aerial vehicles (UAVs), the types of UAVs include multi-rotor foldable UAVs and fixed-wing UAVs. The multi-rotor foldable UAV relies on the lift generated by multiple rotors to balance the gravity of the UAV, so that the UAV can fly up, by changing the speed of each rotor to control the stability and attitude of the UAV. The multi-rotor foldable UAV can hover and fly at any speed in a certain speed range. The fixed-wing UAV relies on the thrust generated by propeller as the power of forward flight of the UAV. The main lift comes from the relative motion between the fixed wing and air. Therefore, fixed-wing UAV must have a certain relative velocity without air to have lift to fly. Based on this principle, fixed-wing UAV has the characteristics of fast flight speed, relative economy, large carrying capacity and strong endurance. Since the wing of a fixed-wing UAV is not foldable, the UAV docking station for accommodating the fixed-wing UAV is generally large in its entirety, thereby allowing the accommodation cavity of the UAV docking station to accommodate the fixed wing of the UAV. In order to reduce the volume of the UAV docking station accommodating the fixed-wing UAV and reduce the weight of the UAV docking station, the present disclosure provides an embodiment of the UAV docking station.

Figure 1:
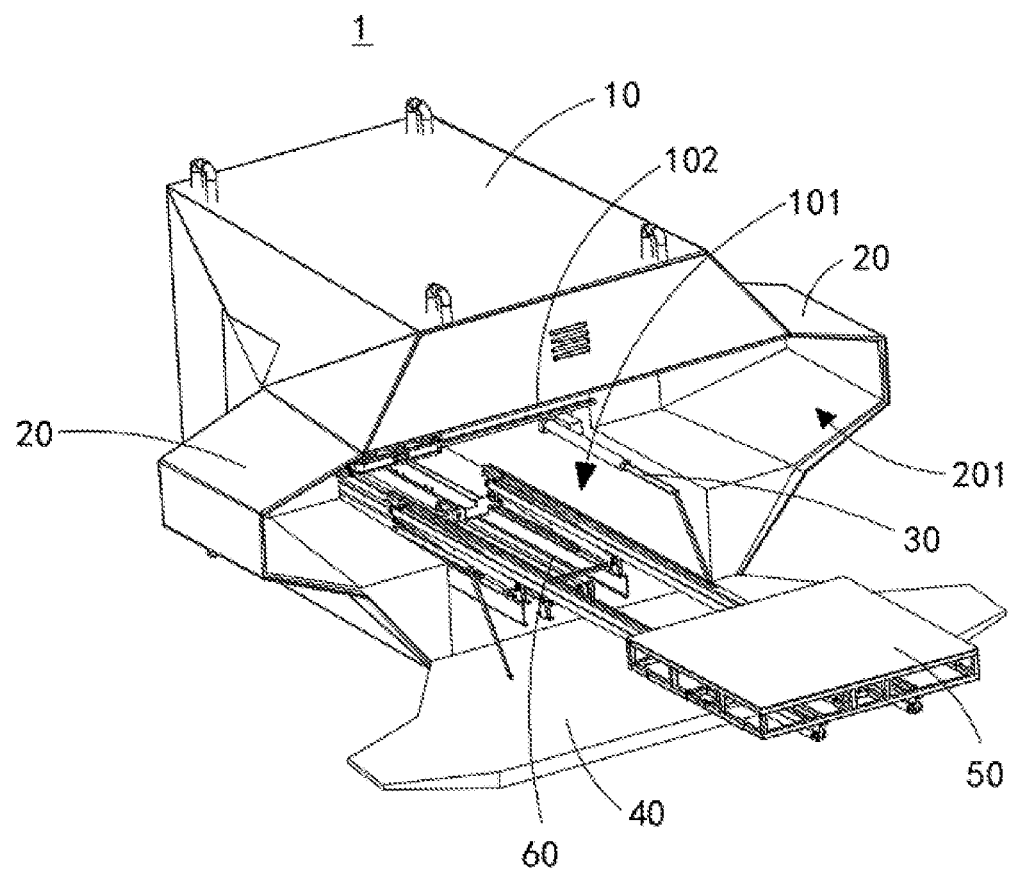
FIG. 1 is an overall schematic diagram of an unmanned aerial vehicle (UAV) docking station according to some embodiments of the present disclosure.
Figure 2:
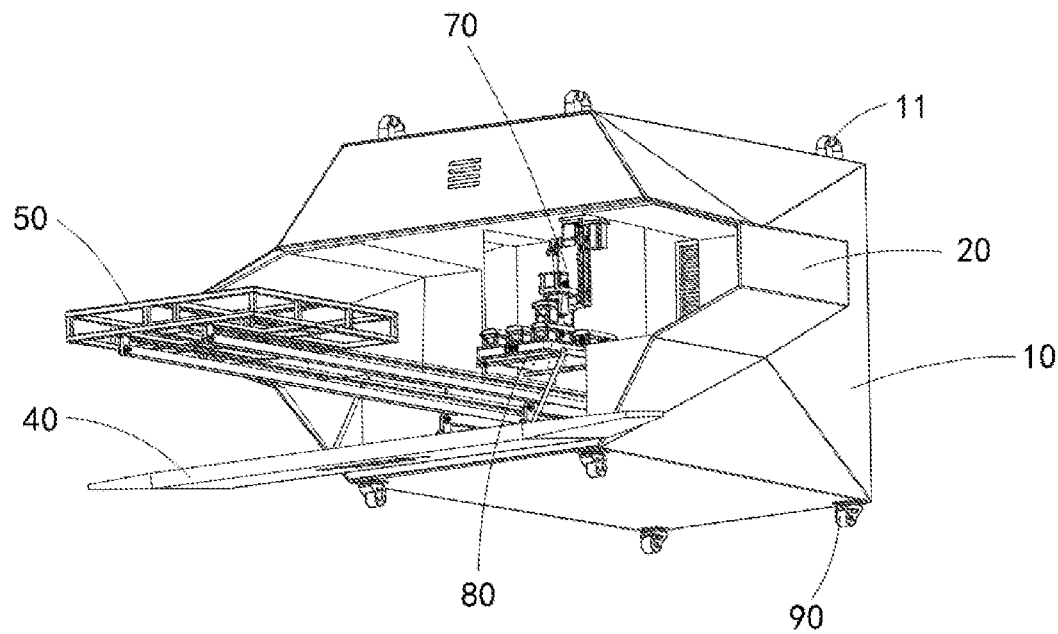
FIG. 2 is a schematic diagram from another perspective view of an UAV docking station according to some embodiments of the present disclosure.

With reference to FIG. 1 and FIG. 2, an unmanned aerial vehicle (UAV) docking station 1 comprises a housing 10, an extension piece 20 and a door 30, wherein the housing 10 is provided with an accommodation cavity 101 and a hatch 102 communicating with the accommodation cavity 101, the extension piece 20 is provided with an extension cavity 201, the extension piece 20 is connected to the housing 10, the extension piece 20 is provided on a side portion of a housing end which is near the hatch 102 of the housing 10, the extension cavity 201 communicates with the accommodation cavity 101, and a cross-sectional area where the extension cavity 201 communicates with the accommodation chamber 101 is greater than a cross-sectional area of the accommodation chamber 101, the door 30 is connected to the housing 10, and the door 30 is provided at the hatch 102 and the door 30 is capable of opening or closing the hatch 102. When the UAV is accommodated in the UAV docking station 1, a fixed-wing part of the UAV is accommodated in the accommodation cavity 101, and a rear half part, near a tail part, of the fixed wing of the UAV can be accommodated in the extension cavity 201 of the extension piece 20. Since the extension piece 20 is arranged at one end, near the door 30, of the housing 10 and the extension piece 20 extends towards an outside of the housing 10, only the cross-sectional area of the part near the door 30 of the UAV docking station 1 is larger, namely, a volume of an end near the door 30 is larger, and the volume of the UAV docking station 1 at the part away from the door 30 can be reduced. The reduction in volume of the UAV docking station 1 improves the overall weight of the UAV docking station 1, making the UAV docking station 1 lighter.

In some embodiments of the present disclosure, a number of the extension pieces 20 is at least two, and two of the extension pieces 20 are symmetrically arranged at both sides of the housing 10. The symmetrical arrangement of the extension pieces 20 improves the stability of the UAV docking station 1.

In some embodiments, the extension piece 20 is integrally formed with the housing 10.

Figure 3:
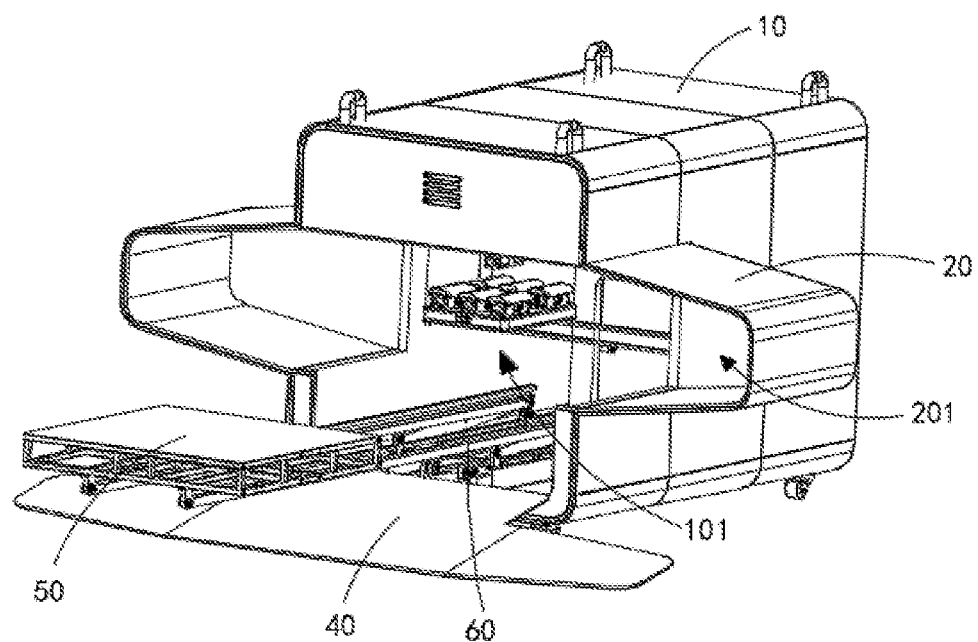
FIG. 3 is a schematic diagram of an UAV docking station according to some embodiments of the disclosure.

In other embodiments, since the models of fixed-wing UAVs are different, and wing lengths of the fixed wings are different between different models of fixed-wing UAVs, an UAV with a longer fixed wing requires a larger space of the extension cavity 201 of the UAV docking station, and an UAV with a shorter fixed wing can allow the space of the extension cavity 201 to be smaller, so that in order to be able to adapt to more types of fixed-wing UAVs by freely changing the extension cavity 201 of the UAV docking station 1, the extension piece 20 is detachably connected to the housing 10, wherein the number of the extension pieces 20 is set as two in a group as an extension portion, the extension portions are provided in a plurality, and the structure and shape of the extension pieces 20 of the plurality of the extension portions are different. With reference to FIG. 3, illustratively, the present embodiment exemplifies one of the structures and profiles of the extension piece 20.

In some embodiments, in order to facilitate the transport and transfer of the UAV docking station 1, the housing 10 is provided with a traction element 11, which is capable of facilitating the transfer of the UAV docking station 1 by a transfer mechanism by grasping the traction element 11 during the production and preparation of the UAV docking station 1.

Figure 4:
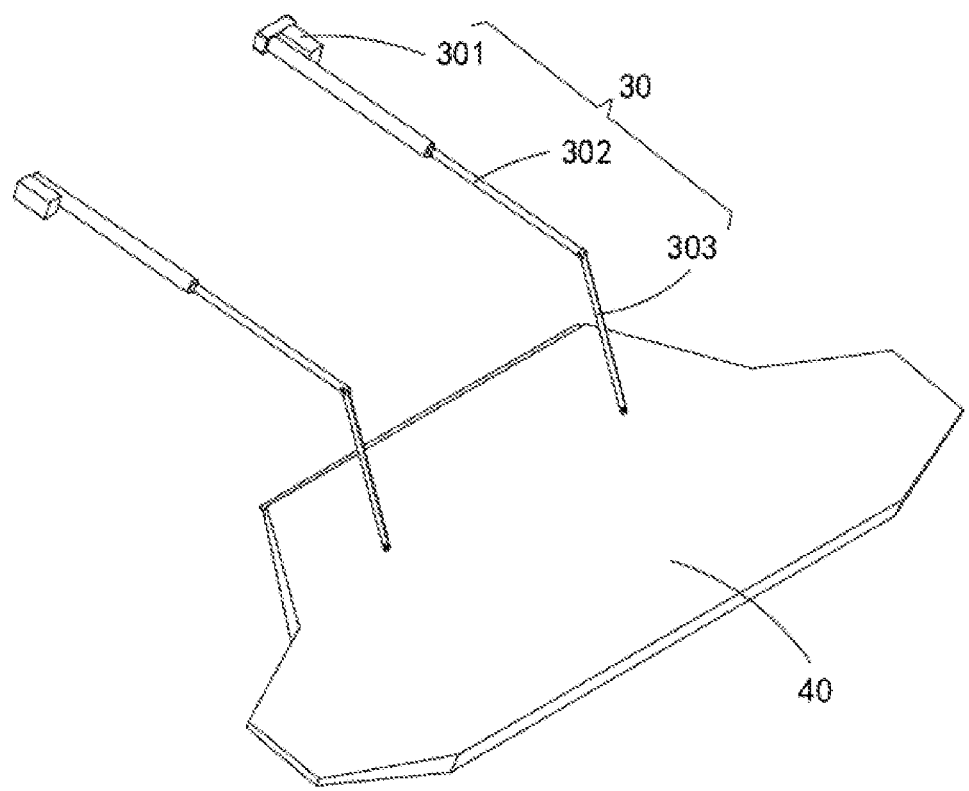
FIG. 4 is a schematic diagram of a first drive mechanism of an UAV docking station according to some embodiments of the present disclosure.

With reference to FIG. 4, in the embodiment of the present disclosure, the UAV docking station 1 further comprises a first drive mechanism 40 disposed within the accommodation cavity 101 and connected to the door 30, the first drive mechanism 40 being configured to drive the door 30 to open or close the hatch 102.

Specifically, the door 30 is rotatably connected to the housing 10, and the first drive mechanism 40 comprises a first drive motor 401, a first telescopic rod 402, and a first connector 403, wherein the first drive motor 401 is arranged in the accommodation cavity 101, one end of the first telescopic rod 402 is connected to the first drive motor 401, the other end of the first telescopic rod 402 is rotatably connected to one end of the first connector 403, and the other end of the first connector 403 is rotatably connected to the door 30. When the door 30 needs to open the hatch 102 of the housing 10, the first drive motor 401 drives the telescopic rod to extend, and the telescopic rod drives the first connector 403 to push the door 30, so that the door 30 rotates relatively to the housing 10 to complete the door 30 opening the hatch 102. When the hatch 102 needs to be closed, the first drive motor 401 drives the telescopic rod to contract, and the telescopic rod drives the first connector 403 to pull the door 30, so that the door 30 rotates relatively to the housing 10 until the hatch 102 is covered.

In some embodiments of the present disclosure, the UAV docking station 1 further comprises a parking apron 50 disposed within the accommodation cavity 101. The parking apron 50 is configured to park the UAV.

Figure 5:
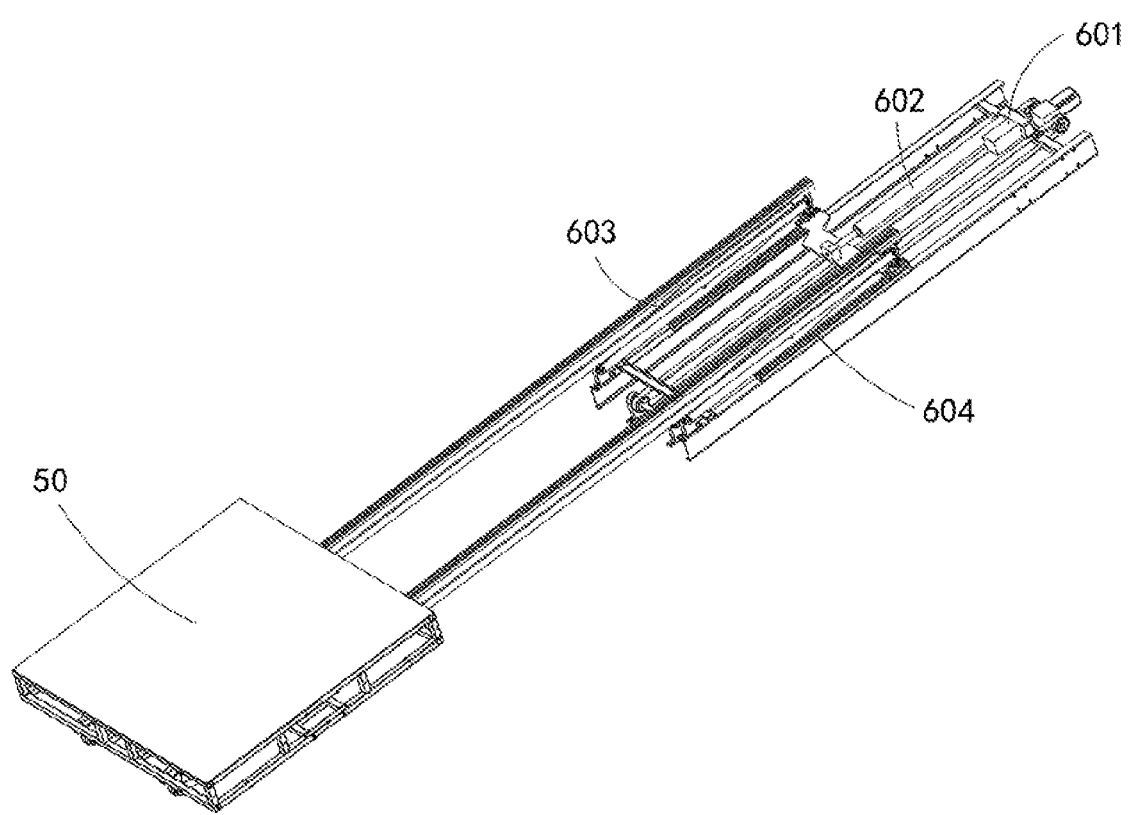
FIG. 5 is a schematic diagram of a second drive mechanism of an UAV docking station according to some embodiments of the present disclosure.

Further, with reference to FIG. 5, the UAV docking station 1 further comprises a second drive mechanism 60, which is connected to the parking apron 50 and which is capable of driving the parking apron 50 out of or into the accommodation chamber 101.

Specifically, the second drive mechanism 60 comprises a second drive motor 601, a second telescopic rod 602, a second connector 603, and a guide rail 604, the second drive motor 601 and the guide rail 604 are both arranged in the accommodation cavity 101, one end of the second telescopic rod 602 is connected to the second drive motor 601, the other end of the second telescopic rod 602 is connected to the second connector 603, the second connector 603 is movably arranged on the guide rail 604, and the parking apron 50 is fixed with the second connector 603. The second connector 603 is movable along the guide rail 604 upon driving by the second drive motor 601. When the UAV docking station 1 accommodating the UAV needs the UAV to go out for an operation, or when the UAV docking station 1 which is empty needs to accommodate the UAV to go home, the door 30 is opened, the second drive motor 601 drives the second telescopic rod 602 to extend, and the second telescopic rod 602 drives the second connector 603 to slide on the guide rail 604, so that the parking apron 50 gradually extends out of the hatch 102 from the accommodation cavity 101 and is exposed to the outside of the UAV docking station 1. When the UAV needs to be accommodated in the accommodation cavity 101 by the UAV docking station 1 after the UAV stops at the parking apron 50, the second drive motor 601 drives the second telescopic rod 602 to contract, and the second telescopic rod 602 drives the second connector 603 to slide on the guide rail 604, so that the parking apron 50 gradually enters the accommodation cavity 101 from the outside of the UAV docking station 1, and then the hatch door 30 closes the hatch 102.

In some other embodiments, to facilitate movement of the UAV docking station 1, the UAV docking station is further provided with a caster 90.

In some embodiments of the present disclosure, by providing an extension piece 20 on the housing, and allowing the extension cavity 201 of the extension piece 20 to communicate with the accommodation cavity 101 of the housing 10, the cross-sectional area where the extension cavity 201 communicates with the accommodation cavity 101 is greater than the cross-sectional area of the accommodation cavity 101, so that the UAV docking station 1 can accommodate an UAV in a smaller volume.

Figure 6:
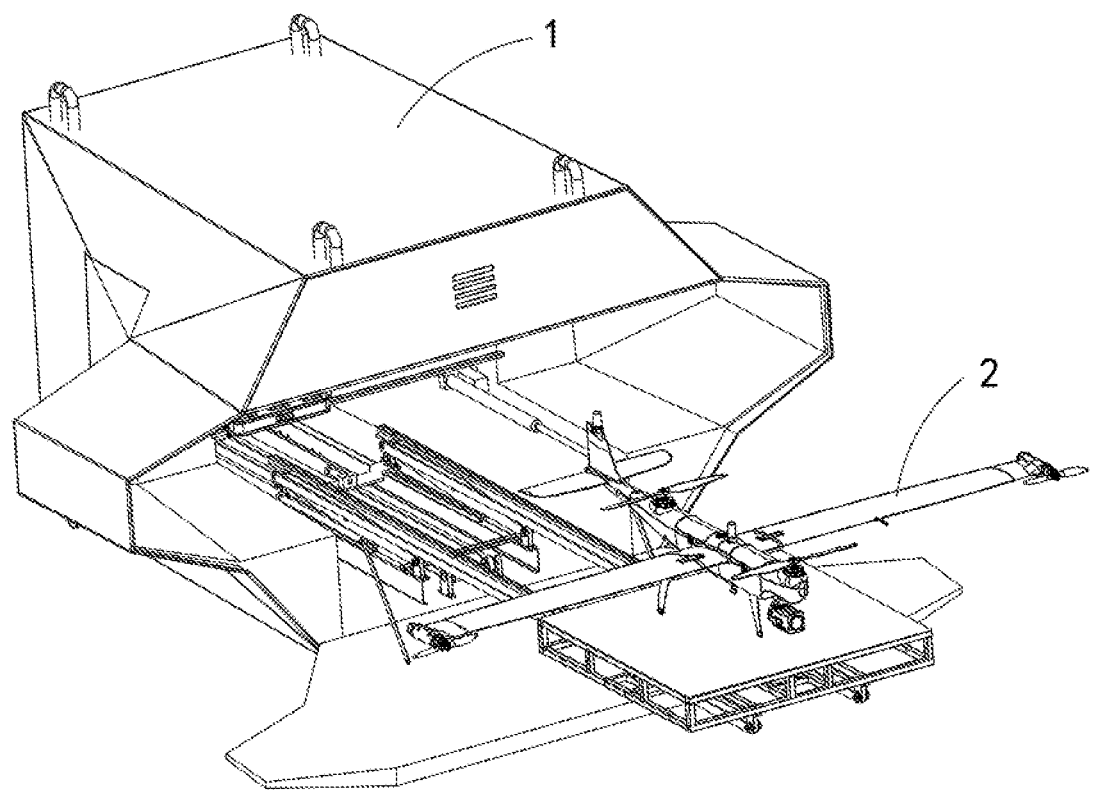
FIG. 6 is a schematic diagram of an embodiment an UAV assembly according to some embodiments of the present disclosure.

With reference to FIG. 6, the present disclosure further provides an embodiment of an UAV assembly 100, wherein the UAV assembly 100 comprises the UAV docking station 1 according to any one of the above-mentioned embodiments and an UAV 2, wherein the UAV 2 is accommodated in the accommodation cavity 101 of the UAV docking station 1, and a fixed wing of the UAV 2 is accommodated in the extension cavity 201. The structure and function of the UAV docking station 1 are described with reference to the above-mentioned embodiments, and will not be described in detail herein.

It should be noted that the description of the present disclosure and the drawings thereof provide preferred embodiments of the present disclosure. However, the present disclosure can be realized in many different forms and is not limited to the embodiments described in the description, and these embodiments are not provided as additional limitations on the contents of the present disclosure, but these embodiments are provided such that the content disclosed in the present disclosure can be more fully and thoroughly understood from the disclosure. Furthermore, the above-mentioned technical features continue to be combined with each other to form various embodiments which are not listed above, and all are considered to be within the scope of the description of the present disclosure. Further, those skilled in the art will be able to make improvements or modifications in light of the foregoing teachings, and all such improvements and modifications are intended to fall within the scope of protection of the appended claims of the present disclosure.

What is claimed is:

1. An unmanned aerial vehicle (UAV) docking station, comprising:
a housing, comprising an accommodation cavity and a hatch communicating with the accommodation cavity;
an extension piece, comprising an extension cavity, and being connected to the housing and disposed on a side portion of a housing end which is near the hatch, and the extension cavity communicating with the accommodation cavity; and
a door, connected to the housing and disposed at the hatch and configured to open or close the hatch;
wherein a cross-sectional area where the extension cavity communicates with the accommodation cavity is greater than a cross-sectional area of the accommodation cavity, and the extension cavity is configured for fixed wings of the UAV.

2. The UAV docking station according to claim 1, wherein a number of the extension pieces is at least two, and two of the extension pieces are symmetrically arranged at both sides of the housing.

3. The UAV docking station according to claim 2, wherein the extension piece is integrally formed with the housing.

4. The UAV docking station according to claim 2, wherein the extension piece is removably connected to the housing.

5. The UAV docking station according to claim 1, further comprising a first drive mechanism disposed within the accommodation cavity and connected to the door, the first drive mechanism being configured to drive the door to open or close the hatch.

6. The UAV docking station according to claim 5, wherein the door is rotatably connected to the housing, and the first drive mechanism comprises a first drive motor and a first connector, the first drive motor being disposed in the accommodation cavity and connected to an end of the first connector, and a second end of the first connector being connected to the door.

7. The UAV docking station according to claim 6, further comprising a parking apron disposed within the accommodation cavity.

8. The UAV docking station according to claim 6, further comprising a parking apron and a second drive mechanism, the second drive mechanism being disposed in the accommodation cavity, the parking apron being connected to the second drive mechanism, the second drive mechanism being configured to drive the parking apron out of the housing from the accommodation cavity or drive the parking apron into the accommodation cavity from outside of the housing.

9. The UAV docking station according to claim 8, wherein the second drive mechanism comprises a second drive motor, a second connector, and a guide rail, the second drive motor and the guide rail being both arranged in the accommodation cavity, the second connector being movably arranged on the guide rail, the second drive motor being connected to the second connector, and the parking apron being fixed to the second connector; and
the second connector is movable along the guide rail upon being driven by the second drive motor.

10. An unmanned aerial vehicle (UAV) assembly, comprising:
an UAV docking station, comprising:
a housing, comprising an accommodation cavity and a hatch communicating with the accommodation cavity;
an extension piece, comprising an extension cavity, and being connected to the housing and disposed on a side portion of a housing end which is near the hatch, and the extension cavity communicating with the accommodation cavity; and
a door, connected to the housing and disposed at the hatch and configured to open or close the hatch;
wherein a cross-sectional area where the extension cavity communicates with the accommodation cavity is greater than a cross-sectional area of the accommodation cavity;
wherein the UAV assembly further comprises an UAV, the UAV being able to be accommodated in the accommodation cavity of the UAV docking station;
a fuselage of the UAV being accommodated in the accommodation cavity, and a fixed wing of the UAV being accommodated in the extension cavity.

11. The UAV assembly according to claim 10, wherein a number of the extension pieces is at least two, and two of the extension pieces are symmetrically arranged at both sides of the housing.

12. The UAV assembly according to claim 11, wherein the extension piece is integrally formed with the housing.

13. The UAV assembly according to claim 11, wherein the extension piece is removably connected to the housing.

14. The UAV assembly according to claim 10, further comprising a first drive mechanism disposed within the accommodation cavity and connected to the door, the first drive mechanism being configured to drive the door to open or close the hatch.

15. The UAV assembly according to claim 14, wherein the door is rotatably connected to the housing, and the first drive mechanism comprises a first drive motor and a first connector, the first drive motor being disposed in the accommodation cavity and connected to an end of the first connector, and a second end of the first connector being connected to the door.

16. The UAV assembly according to claim 15, further comprising a parking apron disposed within the accommodation cavity.

17. The UAV assembly according to claim 15, further comprising a parking apron and a second drive mechanism, the second drive mechanism being disposed in the accommodation cavity, the parking apron being connected to the second drive mechanism, the second drive mechanism being configured to drive the parking apron out of the housing from the accommodation cavity or drive the parking apron into the accommodation cavity from outside of the housing.

18. The UAV assembly according to claim 17, wherein the second drive mechanism comprises a second drive motor, a second connector and a guide rail, the second drive motor and the guide rail being both arranged in the accommodation cavity, the second connector being movably arranged on the guide rail, the second drive motor being connected to the second connector, and the parking apron being fixed to the second connector; and the second connector is movable along the guide rail upon being driven by the second drive motor.

\* \* \* \* \*